Figure 1:
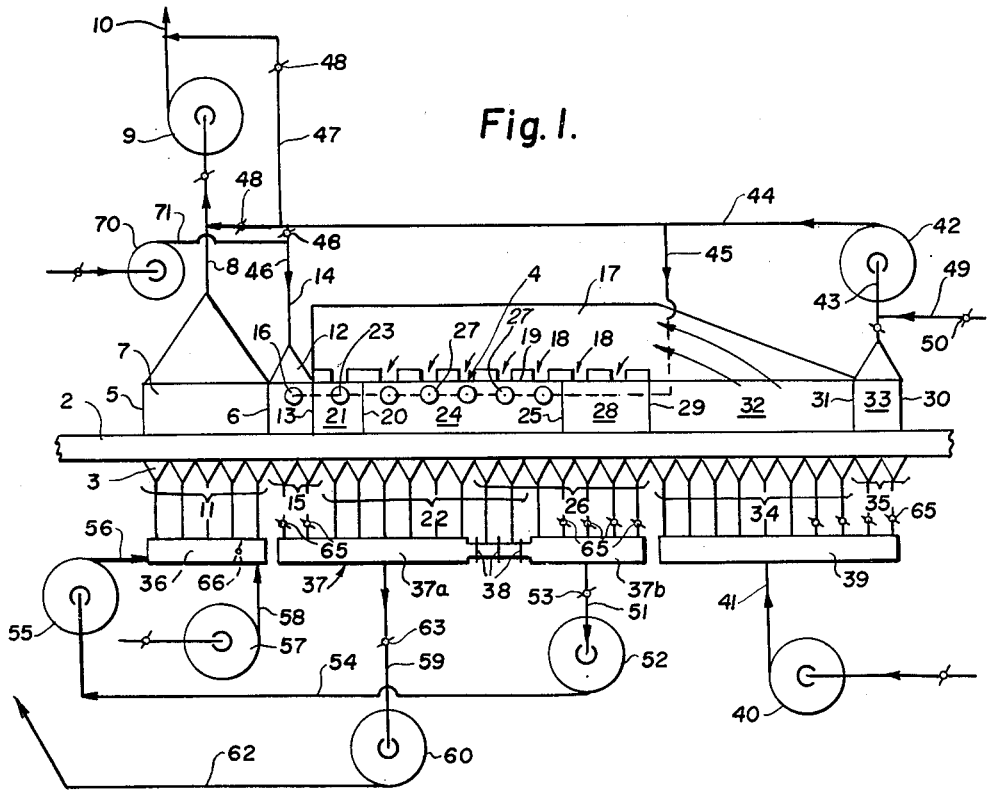

March 9, 1965  J. A. ANTHES ETAL  3,172,754
PROCESS AND APPARATUS FOR FIRE-HARDENING PELLETS
Filed Feb. 12, 1962

INVENTORS.
JOHN A. ANTHES and
DONALD D. PHELPS
BY Christy, Parmelee & Strickland
their ATTORNEYS

United States Patent Office 3,172,754
Patented Mar. 9, 1965

3,172,754
PROCESS AND APPARATUS FOR FIRE-HARDENING PELLETS
John A. Anthes, Bridgeville, and Donald D. Phelps, Coraopolis, Pa., assignors to Dravo Corporation, Pittsburgh, Pa., a corporation of Pennsylvania
Filed Feb. 12, 1962, Ser. No. 172,554
10 Claims. (Cl. 75—5)

This invention relates to a traveling grate apparatus and process of the so-called "Dwight-Lloyd" type and is for an apparatus and process of this type especially useful for the processing of green pellets or formed bodies of ore by firing them to a hardness that enables them to be used in the stock columns of blast furnaces.

It is of course well known in industry to form iron ore into small coherent bodies or pellets, place them on a sintering strand having a succession of pallets that carries the pellets progressively through a drying and preheating zone, a firing zone, and then a cooling zone. Millions of tons of ore are processed according to this general procedure every year. Many hundreds of tons of pellets may be fired on a single sintering strand day in and day out.

Usually the green pellets contain about 8½ to 10% of moisture, sometimes in excess of this. They are loaded into the pallets of the sintering machine to a depth of perhaps sixteen to eighteen inches so that those at the bottom must sustain the weight of this depth of overlying pellets. The initial step of drying serves to drive much of the moisture out of the pellets and preheat them. This prevents the pellets from rupturing or breaking apart as they may do when they are introduced directly into a high temperature environment. This is because in the drying and preheating zones moisture may escape gradually due to moderate temperature being encountered, whereas at high temperatures the moisture is converted to steam so rapidly as to disrupt them. Drying and preheating of course require heat from some source.

Firing may be accomplished either by incorporating solid fuel in or on the pellets while forcing highly heated air or oxidizing gas through the bed of pellets; the ore itself may react exothermically with oxidizing gas to generate some of the heat, or air may be burned with fuel over the bed, and high temperature combustion products so produced are drawn down through the bed. Many times combinations of these heat sources are used. In any event, the pellets are fired to a temperature where they will harden but not fuse too much to one another—temperatures of the order of 2300° to 2500° F. being commonly required. The amount of fuel is substantial and constitutes a major item of cost in preparing ore for smelting in this manner.

Beyond the firing zone, the pellets are cooled by forcing a cooling gas or air therethrough, and it is desirable to use the air that has been heated by cooling the pellets in the zones ahead to conserve the heat. The pellets are at a high temperature after being fired, and the cooling air is forced upwardly through the pallets in the cooling zone so that the heat flow will be upwardly away from the grates forming the bottoms of the pallets and the grates will be cooled instead of heated, as is the case where down draft cooling is employed. The air in the first part of the cooling zone, where both the grates and the pellets are hottest, becomes quite highly heated.

The present invention is for an apparatus and process for circulating the air or gases in such manner as to recover or recuperate more of the heat, particularly that acquired by the cooling gas, more effectively than heretofore and without subjecting the fans for moving the air to destructive temperatures to reduce substantially the fuel requirement and thereby substantially reduce the cost of the pellets. This saving is even more significant where the ore is pelletized at or near the mine which may be very remote from available coal or other fuel.

The invention has for its object to provide a method and apparatus for firing bodies of compacted ore or pellets of ore that will reduce fuel costs and provide a more favorable heat balance.

A further object of the invention is to fire-harden pellets or bodies of compacted ore which avoids diluting hot air from the cooling zone with atmospheric air in the utilization of such air in the firing zone.

A further object of the invention is to operate a sintering machine in the firing or heat-hardening of pellets or compacted ore bodies in a manner to protect the green pellets in the drying stage and to utilize heat from the firing zone in so doing.

Figure 2:
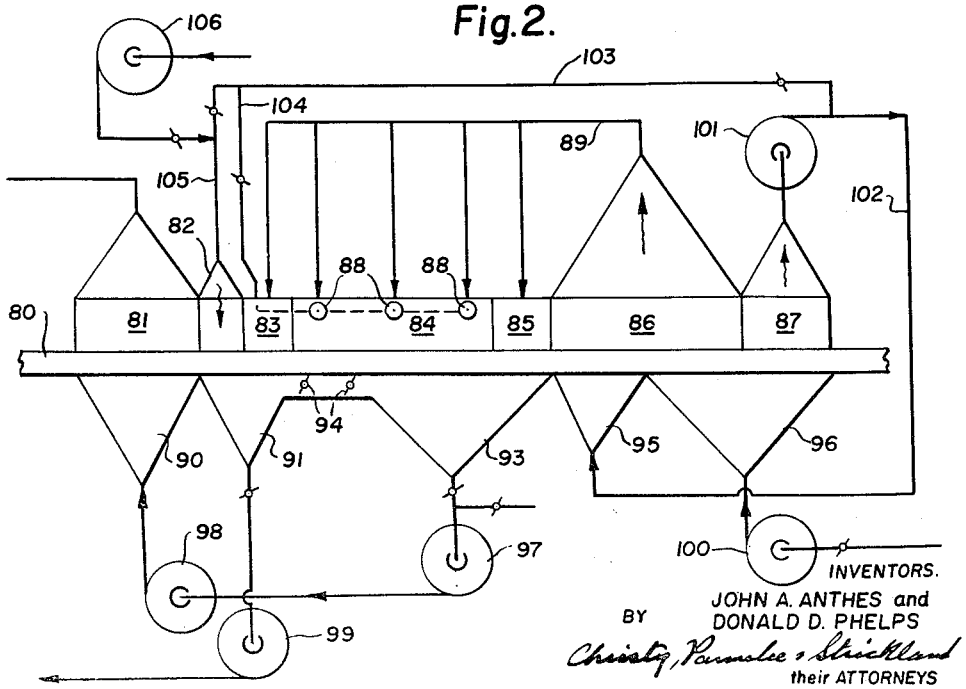

These and other objects and advantages are provided by this invention, which may be more fully understood by reference to the accompanying drawings, in which:

FIG. 1 is a schematic view of an apparatus constructed to embody this invention and carry out the process; and FIG. 2 is a schematic view of a somewhat modified form of apparatus.

In the drawings, which are entirely schematic, details of the construction of the sintering machine and manner of constructing and moving the pallets are omitted, since this conforms to present well known construction and practice in the industry, the invention of the present application pertaining to the hood, duct and fan arrangements for the gas and air flow. Therefore 2 designates generally a so-called sintering strand or traveling grate structure along which a succession of material-holding pallets are moved from left to right. Previously formed green ore pellets or compacted ore bodies, hereinafter generically referred to as "pellets," are loaded into the pallets at the left-hand end of the traveling grate as here diagrammed, and the fired and cooled, or partially cooled pellets are discharged from the right-hand end. The pellets are charged to a uniform depth and there is usually a bed layer of previously-fired pellets or fragments between the pellets and the grates forming the bottoms of the pallets.

As is usual in machines of this type, the pallets move over a succession of windboxes 3 for controlling circulation of gases vertically through the pellets, and these windboxes function in groups, as is usual in the art, some at the left end functioning in connection with drying and preheating, another group for firing, another group for cooling, as will be hereinafter more fully explained. In FIG. 2 the diagram shows each group as a single windbox, but for practical reasons a succession of small windboxes is used as a group in place of a single extended one.

Over the traveling grate there is, with the present invention, a hood structure, designated generally as 4 and which is divided transversely into a succession of separate hoods or zones. While the pallets are moved longitudinally along the structure, there is a sliding seal between the pallets and windboxes so that air or gases may be circulated up or down through the material on the pallets without excessive influx or outflow of air or gases between the windboxes and the pallets. Also the sides of the hood make a sliding seal with the tops of the pallets along each side of the strand for the same reason. A desirable seal construction for use with the present invention is the subject of an application for patent of Victor F. Koontz, Serial No. 191,901, filed May 2 1962, which application is assigned to our assignee.

According to this invention the hood 4 has a front wall 5 at the charging end of the machine and the pallets constituting the traveling grate will have been filled with green pellets before they move under this wall. There is a transverse wall 6 spaced from wall 5, and the enclosed space 7 between the walls 5 and 6 (and the side walls of the hood) is the "updraft drying zone." From the top of the space 6 there is a conduit or duct 8 leading to a suction fan 9 that discharges into a flue duct 10 for waste gases. The length of the chamber 7 in the direction of travel of the pallets spans the distance of the first group of windboxes within the bracketed group 11.

There is a shorter chamber 12 after chamber 7 formed between transverse partition 6 and a succeeding transverse partition 13. There is a duct 14 leading into this zone, and this zone spans a small group of windboxes comprising the bracketed group 15. This part of the machine is the downdraft drying zone. There may be a fuel burner, indicated by circle 16, in the hood in this zone.

Beyond, i.e., to the right of partition 13 the top of the hood 4 comprises a longitudinally-extending duct 17 with a plurality of ports 18 opening through the horizontal roof structure 19. There is a transverse partition 20 spaced from partition 13 defining a space or zone 21 with one of the ports 18 opening into the top of this zone. This is a relatively short zone, here shown as barely spanning the first two windboxes in the group bracketed as 22. This is the preheating zone, and it, too, may have a fuel burner 23 therein.

In the succeeding portion of the hood is the main firing zone or chamber 24 which begins with partition 20 and terminates at transverse partition 25. It spans all of the remainder of the windboxes in the group bracketed at 22 and some in the group bracketed as 26. Several ports 18 open from duct 17 into the zone 24 and there may be several fuel burners 27 along this zone.

Following the zone 24 there is a relatively shorter zone 28 between partition 25 and partition 29. This zone also has ports 18 leading thereto from duct 17, but has no fuel burners. It spans the remainder of the windboxes bracketed in the group 26. This zone is the "after-firing" zone.

The next area under the hood is the cooling zone, which begins at partition 29 and terminates at end wall 30, but which is divided by partition 31 into a longer forward chamber 32 and a shorter rear chamber 33. The chamber or zone 32 extends over a relatively long windbox area comprising the group of windboxes bracketed as 34, while zone 33 extends over the small terminal group of windboxes 35.

The windboxes in the group 11 are all connected into a manifold 36. Windboxes 15, 22 and 26 are all connected with a manifold duct 37. It will be seen that the windboxes of groups 22 and 26 overlap, but there are movable gates 38 across manifold 37 such that by opening one gate and closing another, those boxes in the overlapping groups can be selectively included in one group or the other, as operating conditions may require, and one of the gates 38 always is closed to separate the windboxes in group 22 from those in 26. This in effect provides separate manifolds for the two groups of windboxes 22 and 26 with provision for selectively lengthening one group and shortening the other to the extent permitted by gates 38. The manifold sections for the two groups 22 and 26 are designated 37a and 37b, respectively. The windboxes of groups 34 and 35 are all connected to the common duct or manifold 39 in the embodiment shown in FIG. 1.

The duct arrangement may now be followed. It will be noted first that chamber 32 over the forward end of the cooling zone opens directly into duct 17 leading through ports 18 to the firing and preheating zones. Atmospheric air is forced by blower 40 through pipe 41 into manifold 39. Most of it passes upwardly from this manifold into windboxes in group 34 and through the grates, the bed layer and through the pellets on the travelling grate structure into chamber 32. It will have become highly heated in so doing, and air flows under pressure and without dilution into duct 17 and through ports 18 into the preheating, firing and after-firing zones. It therefore provides secondary highly heated air for the burning of fuel in burners 23 and 27 and as above indicated its temperature is still further increased by the operation of the fuel burners, with the heat of combustion being released into the air and gases in the preheating and firing zones. A heated oxidizing atmosphere for passage downwardly through the pellets on the traveling grate in the firing zone to oxidize the pellets, if they be of an oxidizable ore, or burn fuel which may be incorporated into or onto the pellets, and whether oxidation occurs in the bed of pellets or not, the intensely heated flow of gases downwardly through the bed of pellets heats the pellets with a consequent cooling of these gases.

A smaller amount of air from the fan 40 is supplied to windboxes of group 35 to pass upwardly through the partially cooled pellets into chamber 33, the air in chamber 33 thus being hot, but at a much lower temperature than air in chamber 32. This air in chamber 33 is drawn by fan 42 through pipe 43 and flows forwardly through pipe or duct 44. Some of this air is diverted through pipe 45 to the fuel burners 16, 23 and 27 to provide heated primary air to these burners. Another branch 46 leads from pipe 44 into down draft drying chamber 16, while the pipe 44 may extend over and join pipe 8 leading upwardly from chamber 7. Another branch 47 may lead from pipe 44 to pipe 10 on the discharge side of fan 9. Three dampers at 48 can control the division of flows into pipes 14, 47 and 8. To reduce the temperature of air leaving chamber 33 to a level where it will not be too hot for the fan 42 and provide, if necessary, additional air or oxygen an air inlet 49 on the intake side of teh fan 42 may be provided and there may be a damper 50 in this air inlet to control the amount of cold air so admitted.

There is a duct 51 leading from manifold section 37b to a suction fan 52, there being a damper in this duct at 53. This fan draws gases from the windboxes of group 26 and moves it through duct 54 to the intake of a blower 55 that discharges the gases through connection 56 to the manifold 36, from whence it is forced upwardly from windboxes in group 11 through the freshly entering pellets. Also, a fan 57 may drive some atmospheric air through pipe 58 into the opposite end of manifold 36 to flow upwardly through the last one or two windboxes in group 11.

A duct 59 leads from manifold section 37a through fan 60 to exhaust pipe 62 that may lead to the flue. There is a damper 63 in pipe 59. There may be other dampers 65 at various locations in the several air or gas passages to regulate flow to or from selected individual windboxes, as now generally provided in the art.

In the practice of the process the green pellets entering under the zone or chamber 7 are subjected to an updraft of moderately heated gases forced upwardly therethrough by blower 55, the heated gases being those that have resulted from the firing of the pellets, since they are drawn from windboxes of group 26. Updraft drying is here employed because when the heated air first strikes the moist pellets, it absorbs water vapor. As this gas progresses vertically through the bed, it is cooled and vapor is condensed on the colder pellets. With downdraft initial drying, sufficient moisture may be condensed on the pellets in the lower portion of the pellet bed to soften them to a point where they are mashed down by the weight of the overlying ones. With initial updraft drying the condensation occurs in the pellets in the upper layer of the bed where the weight of the overlying pellets is less, or negligible. With updraft drying the grates constituting the bottoms of the pallets and the bed layer will be first contacted by the hot gases and will absorb considerable heat. By blowing ambient air from the atmosphere outside the machine with fan 57 into the windboxes of group 11 most remote from the entrance, such air will be heated by the grates and bed layer and serve to warm and dry the pellets higher up in the bed of pellets. This arrangement serves to utilize heat that has heretofore been lost and incidentally reduce to some extent the required capacity of the exhaust fan 60, as will hereinafter be explained. A damper 66 may be provided in manifold 36 to permit tempering the atmospheric air, if desired, with some of the recirculated gases or vice versa. The gases used in the updraft drying are relatively low temperature gases, as will hereinafter appear.

By the time the pellets will have moved into zone 12, most of the free moisture will have been removed from the pellets in the lower level of the bed, but there will be added moisture on the pellets in the upper part of the bed by reason of the cold pellets at the top condensing moisture from the rising current of air that has extracted moisture from the pellets below. Consequently it is desirable that in zone 12 the pellets be contacted with heated gases from the top down to then dry the pellets in the upper portion of the bed. Since the pellets in the lower part of the bed at this stage have been warmed and dried, they do not condense moisture from the downflowing gases. Warm drying gases from the chamber 33 are made available through blower 42, pipe 44, and branch pipe 14. This warm air is drawn downwardly through the bed from chamber 12, to windboxes 15 into manifold section 37a and pipe 59 to be exhausted to the flue. A positive pressure exists in windboxes 11 relative to chamber 7, but by regulation of the updraft exhaust fan 9 and blowers 55 and 57 this differential can be regulated. In zone 12, a reverse condition prevails, the chamber 12 above the bed being at a positive pressure relative to windboxes 15.

Where downdraft drying has heretofore followed updraft drying in pellet firing, the downdraft air removed heat from the bed layer and grates and was exhausted, but by using fan 57 as above explained, this heat is now recuperated. Also since the air entering the windboxes 15 will be perhaps as much as 200° F. cooler by reason of the previous cooling of the bed layer and grates, the volume of gas will be lower and the required capacity of the exhaust fan 60 may therefore be less.

After being dried and partially heated in the drying zones, the pellets move into the preheating zone provided between chamber 21 and the first windboxes of group 22. Here there is a positive pressure in the chamber 21 relative to the windboxes. The air entering chamber 21 from duct 17 is derived from the forward end of the cooling zone so that it is at a relatively high temperature and thereby supplements fuel burner 23, which is also receiving preheated primary combustion air from duct 44 and branch pipe 45. In this zone the dried pellets are exposed for a short time to a flow of high temperature gases through them, and the pellets at the top of the bed particularly reach a relatively high temperature, such that the thermal shock is not too great when they enter the succeeding zone. The heat from the gases passing through the pellets is largely absorbed by the pellets so the gases entering the first windboxes of group 22 carry little heat and they are largely spent combustion gases not usable for any purpose, so that they pass to the exhaust fan.

In the firing zone 24 there are several burners 27 and a high temperature atmosphere is maintained, which, if the pellets are of or contain oxidizable material, is an oxidizing atmosphere. A great amount of the heat for this zone is derived from the air in duct 17 coming from the forward end of the cooling zone and the heated primary combustion air from ducts 44 and duct 45 leading to the fuel burners. The heat generated by the burners then supplies the additional heat in the firing zone to raise the already hot air from the cooling zone to the pellet firing temperature. In the early part of the firing, the upper pellets are first heated, since the heating or firing is from the top down and the downflowing gases are cooled by contact with the pellets lower down in the bed and enter the windboxes at a relatively low temperature. They, too, are comprised largely of products of combustion and may be exhausted. Therefore all of the windboxes in group 22 are connected with the waste gas exhaust fan 60.

However, as firing progresses the temperature of the entire bed increases, and at some point best determined by practice, the downflowing gases are at a temperature where they enter windboxes 26 and this point determines how the dampers 38 shall be adjusted to vary the number of windboxes in group 22 and group 26.

In the firing zone the pellets will reach temperatures between 2300° F. and 2500° F., but the entire depth of the bed will ordinarily not simultaneously reach this temperature, because the pellets themselves ordinarily contain oxidizable ingredients or are an oxidizable material and maximum temperatures progress downwardly through the bed as combustion occurs at progressively lower levels. Therefore there is a considerable temperature gradient through the bed which is constantly changing, with a consequent wide temperature variation in the gases at the beginning and end of the series of windboxes in group 26. As these gases mix in flowing to blower 52, the average temperature of the mixture therefore is low enough that the fan 60 will not be overheated and these gases are not too hot for the updraft drying. The recuperation of heat from these gases by their use in updraft drying constitutes an important phase of this invention.

Since the traveling grate is continuously moving, the pellets on top of course becomes progressively hotter as they are carried along, but the heat does not penetrate the bed instantly so that if, for example, the pellets at the top of the bed reach 1800° F. in the first few feet of travel in the firing zone the pellets at the bottom will not reach this temperature until they have moved considerably further, and by the time they have reached such temperature, the ones at the top, directly above, will be much hotter, perhaps near the maximum. In the parlance of the industry, the heat fronts progress diagonally through the bed. In the after-firing zone 28, the pellets at the top and to some depth have already reached the maximum desired temperature so that no fuel is burned in this zone, but heated air, entering through port 18, flows down through the bed of pellets picking up heat from the upper portion and carrying it down to those beneath. Hence it conserves heat if no fuel is burned in this zone and the hot gases carried out of the cooling zone are at a sufficiently high temperature in the after-firing zone to pick up the travel additional heat from the pellets above and "travel" it through the still insufficiently heated ones at the bottom and complete the firing in this way.

The bed of pellets moves from the after-firing zone 28 into the cooling zone, which as above described, is divided into the forward region under chamber 32 and the after or terminal region under hood 33. The relative lengths of these two chambers may be varied, according to the location of partition 31.

If downdraft cooling were employed, the heat from the pellets would be carried by the cooling air to the pallet grates on which the pellets rest. By using updraft cooling, the incoming air first contacts the grates which are then at about their highest temperature or close thereto, and first cools them and then the cooling progresses upwardly through the bed layer and bed of pellets. The air emerging from the bed of pellets is highly heated and too hot to be moved by a blower or suction fan. Heretofore it has been the usual practice to employ a fan to draw the air through the bed and carry it forwardly to the firing zone, but to do so atmospheric air was introduced into the heated air before it reached the fan to dilute the hot air, and reduce the high temperature of the air moving through the fan. This not only required added fan or blower capacity, but reduced the temperature of the air supplied to the preheating and firing zones, making it necessary to burn more fuel in these zones to again bring the gases up to the required temperature. Also it provided more air than is needed, and which therefore had to be wasted, resulting in inefficient use of the heat and waste, as well as adding to initial cost of the machine and greater power to operate it.

With the present invention the blower 40 maintains a relatively high pressure in the windboxes of group 34, and to move the air into the duct 17 a positive pressure, as high as three or four inches of water may be necessary. For this reason, to prevent highly-heated air from blowing out under the edges of the hood and the tops of the pallets, a particularly effective seal, such as that disclosed in the Koontz application above referred to is necessary, or other adequate known form of seal may be used. The use of a positive pressure to force the air through the forward part of the cooling zone and induce its travel along the duct 17, without dilution of the heated air, is another important phase in the recuperation of heat according to this invention. It will be observed that air passing upwardly through the forward end of the cooling zone moves down through the bed in the preheating, firing, or after-firing zones, the oxygen of the air being converted in the second pass through the bed partially into combustion gas, and then a large part of it passes a third time through the bed in updraft drying, so this part is never cooled to a temperature below a few hundred degrees F. until it has yielded most of the heat to the pellets or the drying thereof. More air is required for cooling than for drying. By separating the air and gases from the downdraft drying, preheating zone and forward end of the firing zone from those at the rear end of the firing zone and after-firing zone, the air and gases which carry the most heat are utilized in the updraft drying, thereby recuperating the heat in the most effective manner.

Although not shown in the drawing, the usual practice of using a dead plate under the traveling grate is employed where one windbox is at a positive pressure and an adjacent one negative, as in the area under partition 29 or under partition 6. With such a plate the bottom of the grate moves over a flat plate between the adjacent windboxes, reducing the amount of air that may "short circuit" from the positive to the negative windbox below the traveling grate or through the pellets, since it increases the horizontal distance the gases must travel through the bed over the vertical distance.

There is also updraft cooling in the after part of the cooling zone under the hood chamber 33. The temperature of the pellets will have been substantially reduced when they reach this part of the cooling zone and the volume of air is relatively small. Its temperature is such that it may be handled through fan 42, and if it is either too hot or the volume insufficient, atmospheric air is controlled amounts may be introduced through pipe 49 and regulated by damper 50. The air used as primary air in the burners 27 may be at a higher temperature than the air used for downdraft drying, and for this reason there may be a blower 70 and pipe 71 for introducing atmospheric air into pipe 14 to temper the downdraft air. Some air in pipe 44 is exhausted through pipe 14 and a damper 48 to the intake of fan 9, as shown in FIG. 1 to raise the temperature of the saturated gases from the updraft drying to a level above the dew point of such gases and avoid condensation of moisture as water in the fan, while any remaining excess may go directly to an exhaust flue through pipe 47 with its damper 48, making it unnecessary for the exhaust fan 9 to handle more of the excess gas from pipe 44 than is necessary to prevent condensation at the fan.

In the modification shown in FIG. 2 there is a two-stage cooling operation to be employed where a high degree of cooling of the pellets is desired. In this case the second cooling zone is elongated both above and below the sintering strand, but the arrangement of hoods or zones above the sintering strands is otherwise substantially the same as shown in FIG. 1. However the windbox arrangement at the cooling end is modified. In FIG. 2, instead of showing the individual windboxes in groups, each different group of windboxes is schematically illustrated by a single large windbox compartment under the sintering strand.

In this view 80 designates schematically the traveling grate with a succession of moving pallets filled with pellets. Over the strand 80 there is an upright drying hood 81 at the beginning of the strand corresponding to chamber 7 of FIG. 1. There is a downdraft drying hood 82 corresponding to chamber 16 of FIG. 1; a preheating chamber 83 corresponding to chamber 21 of FIG. 1, and there is a main firing chamber 84 corresponding to the main firing chamber 24 of FIG. 1. Following the main firing chamber there is an after-firing chamber 85 corresponding to 28 of FIG. 1. The cooling area is divided into two chambers 86 and 87, 86 being slightly shorter than 32 of FIG. 1, and 87 being longer than 33 of FIG. 1. The partitions dividing the hood into the above-enumerated chambers are schematically illustrated. In the firing chamber there are burners 88 corresponding to 27 of FIG. 1, and there may also be such a burner in the preheating zone if desired. A longitudinally-extending duct 89 conveys gases from the forward end of the cooling zone forwardly to the preheating zone, the main firing zone and the after-firing zone as in FIG. 1.

Under the sintering strand there is a windbox arrangement 80 corresponding to group 11 of FIG. 1, another group of windboxes corresponding to 15 and 22 of FIG. 1, this second windbox area being designated 91. 93 designates a group of windboxes corresponding to 26 of FIG. 1 and the dampers 94 serve the function of dampers 38 in the previous figure. Under the cooling zone at the forward end there is a short windbox area 95 as distinguished from the long one in FIG. 1, and succeeding this is a long windbox area 96 as contrasted to the short windbox area 35 of FIG. 1.

The fan for withdrawing gases from the windbox area 93 is designated 97, and 98 is the updraft fan for moving gases from 97 upwardly through the updraft drying zone. The exhaust fan is designated 99 and is arranged similarly to the corresponding fan 60 of FIG. 1.

The main difference between the arrangement shown in FIG. 1 and FIG. 2 is in the circulation of the cooling gases. In FIG. 2, a blower 100 forces atmospheric air into the terminal windbox area 96 of the cooling zone only. Some of this air rises through the bed of pellets to cool them beneath the hood 86, and the remaining part of the air so introduced flows upwardly through the bed of pellets into the hood area 87. This air is withdrawn by fan 101 and circulated through duct 102 to windbox area 95 at the forward end of the cooling zone.

With this arrangement the air leaving the zone 87 will be at an average temperature of about 870° F. Since this already heated air is taken through duct 102 and again passed through the pallets in the hottest part of the cooling zone, the air, after passing through the cooling zone the second time, will have a very high temperature. This will give a high thermal efficiency because fuel is required, as it is in FIG. 1, only to raise the temperature of this air carried forward through duct 89 at whatever it may be to the firing temperature of 2300° F. to 2500° F. Since the heated air introduced through the windboxes 95 will be less effective to cool the pellets than atmospheric air, the pellets will still have a relatively high temperature as they begin their travel over the windbox 96. Consequently some of the incoming atmospheric air in the windbox area 96 may pass through these still hot pellets and mingle with the air that is introduced through the windboxes 95 and mix with the air from windboxes 95. This makes it unnecessary for fan 101 to handle all of the air used for cooling and prevents the pellets from being excessively hot when they move into zone 87.

If the air passing through the fan is at 850° F. it is not too hot to be circulated through the fan 101. A branch pipe 103 may carry some of the air from the discharge side of pump 104 forwardly, part of it to flow through pipe 104 to the burners 88 and provide primary combustion air therefor, and part of it will flow through pipe 105 into the downdraft drying hood. A blower 106 may introduce tempering air into the pipes 105 should the temperature of the recirculated air be too high for downdraft drying.

Dampers may be provided as described in FIG. 1 in the various pipes for regulating the various windboxes and the updraft exhaust hood may be provided with an exhaust fan with arrangements similar to that shown in FIG. 1 for taking care of exhaust air or gases.

In both forms of the invention, air is forced upwardly through the forward end of the cooling zone and a positive pressure is maintained above the forward end of the cooling zone sufficient to effect the travel of the gas forwardly to the preheating, firing and after-firing zones so that the hot air does not need to be diluted for pass through a fan. In both forms of the invention gases from the last part of the main firing zone and the after-firing zone are forced upwardly through the preheating zone. In both forms of the invention there is a circulation of atmospheric air first upwardly through the cooling zone, then downwardly through the firing or after-firing zone, and then upwardly through the updraft drying zone. In FIG. 2 as in FIG. 1 some form of seal must be used between the hood and the moving pallets particularly over the cooling zone, to prevent any blowout of substantial amounts of air between the sides of the hoods and the tops of the pallets, and special seals provided for such use either as shown in the above-mentioned Koontz application or as presently available should be employed.

It is of course understood by those skilled in the art that in a pelletizing application such as is here contemplated, the pallets are filled with pellets to substantially the level of the top of the pallets so that there will be a minimum transfer of air or gases under the partitions and over the bed of pellets from one zone to another. Some short-circuiting of the flow cannot be avoided, but it is known to the art that it can be effectively minimized, and in this arrangement dead plates may be employed as above described.

While we have here shown for clarity of illustration partitions in the hood between each zone, the effect of partitions can be secured in practice between adjacent zones in both embodiments by tempering the gases and controlling gas flow. For example between the downdraft drying and the preheating zones partition 13 might be omitted since gases travel in the same direction in these zones and the gas flow takes the path of least resistance through the bed, which is generally vertical, and the boundaries of the two zones are not critical. By dampering the suction in the windboxes, tempering the gases in duct 14 and regulating the volume of gases as required, comparable conditions may be secured without partition 13. The same may be true, for example, of partition 20.

Also, in some cases, as where the pellets are of extremely low moisture content or may be heated from a previous operation, down-draft drying alone may be used, in which case the heated air from windboxes 26 or 93 would be channeled into the top of the drying hood area only, and updraft drying would be eliminated.

Important saving of heat is effected in both embodiments by forcing hot air from the cooling zone into the preheating, firing and after-firing zones without diluting it with atmospheric air or operating the fans at excessively high temperatures. Heat is effectively recuperated by using only the gases and/or air from the rear portion of the firing zone and the after-firing zone to the updraft cooling zone, while exhausting gases from the preheating zone and forward part of the firing zone. Heat is recuperated by blowing outside air upwardly through the rear portion of the updraft drying zone to remove heat from the grates and bed layer before downdraft drying is commenced, and this arrangement also reduces the required capacity of the exhaust fan, 60 in FIG. 1 and 99 in FIG. 2. A part of the total air travels through the bed three times, first up in the cooling zone, down in the firing and after-firing zone, and up in the drying zone, and in FIG. 2 some flows four times through the bed.

We claim:
1. In the process of firing pellets arranged in a bed on a traveling grate wherein the pellets move in succession through an updraft drying zone, a downdraft firing zone and an updraft cooling zone, the steps comprising:
    (a) forcing air under pressure upwardly through the bed of previously fired hot pellets in the cooling zone whereby the air is heated by transfer of heat from the pellets to the air,
    (b) flowing the air so heated directly into a hood over the traveling grate in which there are fuel burners to supply secondary air to the fuel burners and thereby additionally heat the already heated air,
    (c) then repassing such additionally heated air along with combustion gases now combined with the air downwardly through the bed of pellets and the traveling grate to heat the pellets by transfer of heat therefrom to the pellets, with a resulting reduction of the temperature of such air and gases,
    (d) separating the air which has thus passed for the second time through the bed and the combustion gases combined with the air into a hotter portion and a cooler portion, and
    (e) passing the hotter portion of the air so separated along with combustion gases admixed therewith through the bed of pellets in the updraft drying zone.

2. In the process of firing pellets on a traveling grate moving over a series of windboxes under a hood with the windboxes and hood arranged to provide in succession an initial updraft drying zone, a downdraft preheating zone, a downdraft firing zone, both the preheating and firing zone having fuel burners therein, and an updraft cooling zone, the steps comprising:
    (a) conducting air which has passed upwardly through the grate and bed of pellets in the cooling zone and directly after such upward passage into the preheating and firing zones to thereby supply secondary combustion air to the burners in said zones and further increase the temperature of the already hot air and gases in the firing zone by the burning of fuel directly in the air,
    (b) effecting such direct flow of air from the cooling zone to the preheating and firing zones solely by the maintenance of a higher pressure of air in the hood over the cooling zone than in the hood over the preheating and firing zones,
    (c) passing the heated air and combustion products downwardly through the bed of pellets in the firing zone to thereby heat the pellets and reduce the temperature of the air and gases,
    (d) and utilizing some of the air and gases after the downflow thereof through the bed of pellets in the firing zone for updraft circulation through the updraft drying zone while venting gases that have passed through the pellets in the preheating zone to atmosphere.

3. In the process of firing pellets on a traveling grate as defined in claim 1 wherein the cooling zone is divided into forward and rear sections wherein only the heated air from above the forward portion of the cooling zone is passed directly to the burners in the preheating and firing zones and the cooling air from above the rear section of the cooling zone is used as primary air for said burners.

4. In the process of firing pellets as defined in claim 3 wherein a portion of the air from the rear portion of the cooling zone is also forced downward through the bed of pellets to effect downdraft drying after the updraft drying and in advance of the preheating zone.

5. The process of firing pellets and the like on a traveling grate machine having a traveling grate with a forward end and a rear end and with a hood thereover providing drying, preheating, firing and cooling zones, with the cooling zone having forward and rear portions, the traveling grate having windboxes thereunder cooperating therewith through which confined air and gases flow through the bed and the traveling grate between the portion of the hood above and the windboxes below, the firing zone having fuel burners therein, said method comprising:

(a) forcing air upwardly through the traveling grate and the bed of pellets in the forward portion of the cooling zone into the hood thereover and maintaining above said portion of the cooling zone a pressure of air which is positive with respect to the air pressure in the firing zone, (b) conveying the air entirely by such differential pressure and at substantially the temperature acquired by it in passing through the traveling grate and the bed of pellets thereon directly to the preheating and firing zone and utilizing it at least in part for secondary combustion air by the burners in the firing zone while simultaneously further raising its temperature, (c) inducing a flow of air and combustion gases from the firing zone through the pellets and the traveling grate to the windboxes under the firing zone by maintaining a negative pressure in the windboxes under the firing zone relative to the pressure in the firing zone, (d) maintaining the air and gases drawn through the pellets and the traveling grate at the rear end portion of the firing zone separate from the air and gases passing through the pellets and the grate at the forward end of the firing zone, (e) forcing air and gases so separated from the rear end of the firing zone upwardly through the traveling grate and pellets in the forward portion of the drying zone, (f) while forcing ambient atmospheric air upwardly through the grate and bed of pellets in the following portion of the drying zone, (g) and finally moving air from the rear portion of the cooling zone by a fan and forcing it downwardly through the bed of pellets and the grate ahead of the preheating zone to effect downdraft drying.

6. A traveling grate machine for firing formed bodies of ore particles comprising a traveling grate structure on which a bed of formed ore bodies to be fired is provided, said traveling grate having forward and rear ends and an intermediate portion, (a) means at the forward end of the traveling grate providing an updraft drying zone, said means comprising a first hood section above the traveling grate and a series of separate windboxes under the traveling grate below the first hood section, (b) means intermediate the ends of the traveling grate providing both a downdraft firing and after firing zone, said means comprising a second hood section above the traveling grate structure and a series of several windboxes below the traveling grate structure under said second hood section, (c) a series of fuel burners in the second hood section, (d) means at the rear end of the traveling grate structure providing a cooling zone comprising a third hood section above the grate structure and a series of several windboxes below the grate structure under the third hood section, (e) means for forcing atmospheric air upwardly from the windboxes in the cooling zone into the third hood section and maintaining a positive pressure therein relative to the pressure in the firing zone, (f) a duct separate from the hood leading directly from the third hood section for conducting heated air directly from within the third hood section into the second hood section to supply secondary air to the burners in said second hood section, said burners serving to further heat the air in the second hood section, (g) means for drawing heated air from the second hood section downwardly into the windboxes under the firing and after firing zones, (h) and means for conducting air and gases from those last-named windboxes where the air and gases are hottest to the windboxes of the series in the updraft drying zone.

7. A traveling grate machine as defined in claim 6 wherein the third hood section in the cooling zone is divided into forward and rear portions and the separate duct for conveying gases from the third hood section to the second hood section communicates with the forward portion of the third hood section so that only the hottest gases in the third hood section are passed through said duct to the second hood section, and means for conducting air from the rear portion of the third hood section to the fuel burners and arranged to supply primary air to said fuel burners.

8. A traveling grate apparatus as defined in claim 7 wherein there is a downdraft drying zone having a hood section above the traveling grate and windbox below the traveling grate under said last-named hood section, and means for moving air also from the rear portion of the third hood section to the hood section of the downdraft drying zone.

9. A traveling grate machine for firing pellets or the like as defined in claim 7 in which means is provided for circulating air from the rear portion of the cooling zone to the windboxes under the forward portion of the cooling zone along with ambient air from the atmosphere whereby some of the air is twice circulated through the cooling zone.

10. A traveling grate machine for firing formed bodies of ore particles comprising a traveling grate structure on which a bed of formed ore bodies to be fired is provided having forward and rear ends, means at the forward end of the traveling grate providing an updraft drying zone, said means comprising a hood above the traveling grate and windboxes under the traveling grate below the hood, means intermediate the ends of the traveling grate providing a downdraft firing zone, said means comprising a second hood above the traveling grate structure and windboxes below the traveling grate structure under said second hood, means at the other end of the traveling grate structure providing a cooling zone comprising a third hood above the grate structure and windboxes below the traveling grate structure under the third hood, the third hood being divided into forward and rear portions, a duct leading from the forward portion of the third hood to the second hood, fuel burners in the second hood, means for maintaining a positive pressure in the windboxes under the forward portion of the cooling zone and in the hood over the forward portion of the cooling zone to induce by pressure differential alone a flow of air therefrom through said duct to the second hood for supplying secondary combustion air for the burners in the firing zone, means for exhausting air and gases from the windboxes under the forward portion of the firing zone to atmosphere, means for separately exhausting air and gases from the windboxes at the rear portion only of the firing zone and supplying such air and gases to the windboxes under the forward portion of the first hood at a pressure above the pressure in said first hood to effect the flow thereof upwardly through the grate and pallets thereon into the first hood to effect updraft drying and in so doing heat the traveling grate structure and the lower portion of the bed, and means between said forward portion of the first hood and the second hood for forcing ambient atmospheric air upwardly through the traveling grate structure to cool the same and carry the air upwardly through the pellets to effect drying of the pellets nearer the top of the bed.

References Cited by the Examiner
UNITED STATES PATENTS

| | | | |
|---|---|---|---|
| 2,672,412 | 3/54 | Burrow et al. | 266—21 |
| 3,005,699 | 10/61 | Erck et al. | 266—21 |

FOREIGN PATENTS

| | | |
|---|---|---|
| 600,026 | 6/60 | Canada. |

BENJAMIN HENKIN, *Primary Examiner.*

DAVID L. RECK, *Examiner.*